(12) United States Patent
Beblo et al.

(10) Patent No.: US 9,709,040 B2
(45) Date of Patent: Jul. 18, 2017

(54) RECONFIGURABLE SKIN SYSTEM BASED ON SPATIALLY TARGETED ACTIVATION OF SHAPE MEMORY POLYMERS

(71) Applicant: University of Dayton, Dayton, OH (US)

(72) Inventors: Richard V. Beblo, Englewood, OH (US); John P. Puttmann, Cincinnati, OH (US); Gregory W. Reich, Bellbrook, OH (US); Brian M. Smyers, Lebanon, OH (US); James J. Joo, Centerville, OH (US)

( * ) Notice: Subject to any disclaimer, the term of this patent is extended or adjusted under 35 U.S.C. 154(b) by 281 days.

(21) Appl. No.: 14/512,573

(22) Filed: Oct. 13, 2014

(65) Prior Publication Data

US 2015/0101325 A1    Apr. 16, 2015

Related U.S. Application Data

(60) Provisional application No. 61/889,739, filed on Oct. 11, 2013.

(51) Int. Cl.
*B32B 3/12* (2006.01)
*F03G 7/06* (2006.01)

(52) U.S. Cl.
CPC .......... *F03G 7/065* (2013.01); *B32B 3/12* (2013.01); *B32B 2264/10* (2013.01); *B32B 2264/105* (2013.01); *B32B 2264/108* (2013.01); *B32B 2307/202* (2013.01)

(58) Field of Classification Search
USPC ........................................ 428/117
See application file for complete search history.

(56) References Cited

U.S. PATENT DOCUMENTS

| | | | |
|---|---|---|---|
| 2011/0229685 A1* | 9/2011 | Lin | B32B 3/12 |
| | | | 428/117 |
| 2016/0193810 A1* | 7/2016 | Kang | B32B 15/092 |
| | | | 428/457 |

OTHER PUBLICATIONS

Chun-Hua Zhang, Hui-Ge Wei, Yu-Yan Liu, Hui-Feng Tan, Zhanhu Guo; Enhanced toughness and shape memory behaviors of toughed epoxy resin; High Performance Polymers; Downloaded from hip.sagepub.com at Lamar Univ on Aug. 21, 2012.

Jennifer L. Smith; Material Testing of Shape Memory Polymers for Modular Robotics Applications and Development of a Prototype SMP Gripper For mini-PR2 Robot; from University of Pennsylvania SunFest Technical Report TR-CST, Aug. 27, 2010, pp. 110-134, Philadephia, PA.

* cited by examiner

*Primary Examiner* — David Sample
*Assistant Examiner* — Nicholas W Jordan
(74) *Attorney, Agent, or Firm* — Dinsmore & Shohl LLP

(57) ABSTRACT

Reconfigurable skin systems may include a multi-cellular structure, in which individual cells are filled with a shape memory polymer having conductive chains of conductive particles embedded or dispersed therein. The systems are configured such that application of a stimulus to selected cells causes the shape memory polymer to undergo a phase change in the selected cells and impart a textured surface to one side of the multi-cellular structure.

20 Claims, 8 Drawing Sheets

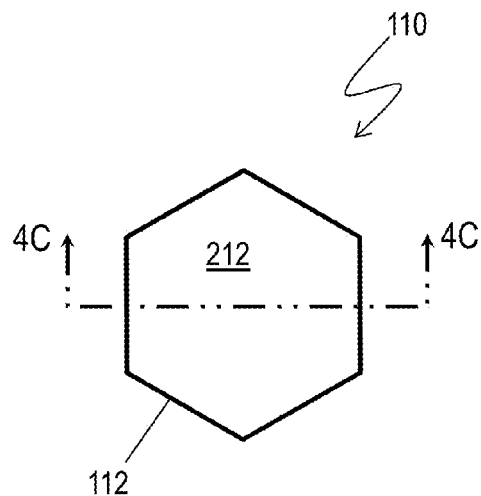
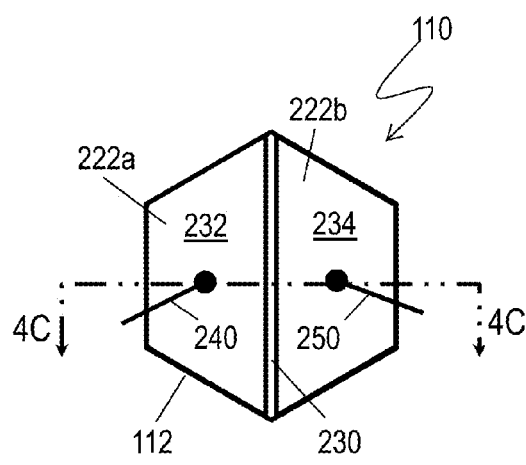
FIG. 4A　　　　　　　FIG. 4B
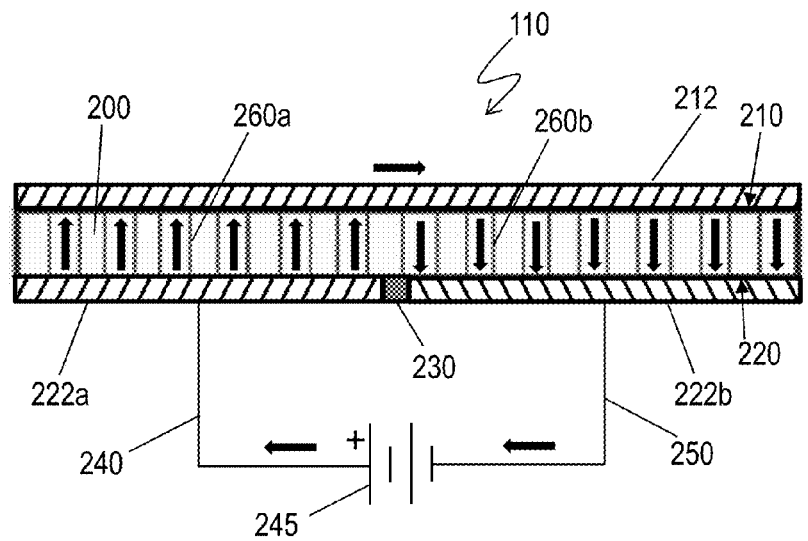
FIG. 4C $$\overline{\overline{Q}}^* = \begin{bmatrix} 1.06 & 1.10 & 0 \\ 1.10 & 1.91 & 0 \\ 0 & 0 & 0.112 \end{bmatrix} \times 10^8 \text{ Pa}$$
FIG. 7A
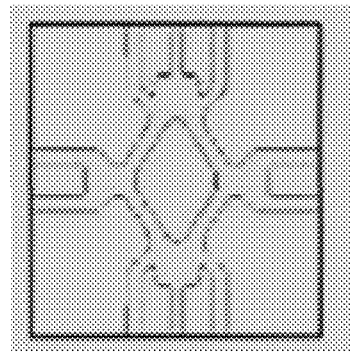
FIG. 7B
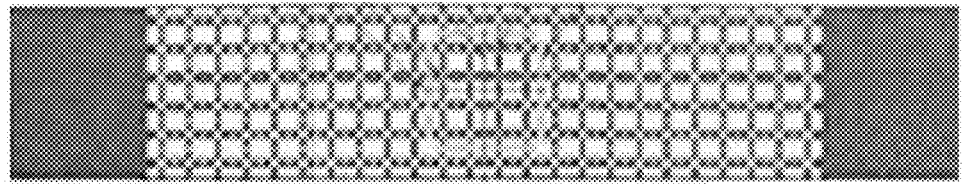
FIG. 7C

RECONFIGURABLE SKIN SYSTEM BASED ON SPATIALLY TARGETED ACTIVATION OF SHAPE MEMORY POLYMERS

CROSS-REFERENCE TO RELATED APPLICATION

The present application claims the benefit of priority under 35 U.S.C. §119(e) to U.S. Provisional Application Ser. No. 61/889,739, filed Oct. 11, 2013.

TECHNICAL FIELD

The present application relates to reconfigurable engineered cellular structures, and more particularly, to reconfigurable skin systems based on shape memory polymers.

BACKGROUND

Reconfigurable systems that experience a shape transformation through phase-change of materials are of considerable interest for accommodating variable performance profiles. For example, in vehicular applications, skin morphing may achieve improved fluid dynamic interaction, such as improved aerodynamic or hydrodynamic travel, thereby increasing fuel efficiency, and providing cost savings in operation. For such systems, engineered cellular structures have been investigated and developed, although such investigations have often been limited to open-cell or elastomer-covered designs.

BRIEF DESCRIPTION OF THE DRAWINGS

FIG. 4A is a top view of an individual cell of the reconfigurable skin system;

FIG. 4B is a bottom view of an individual cell of the reconfigurable skin system;

FIG. 4C is a cross-sectional view of the individual cells of FIGS. 4A and 4B, showing also connection of the electrodes to a power source;

FIG. 7A is an exemplary matrix, the solving of which indicates a target property for the reconfigurable skin system;

FIG. 7B is a CAD version of a test specimen for the cellular structure of the reconfigurable skin system;

FIG. 7C is an exemplary test specimen for the cellular structure of the reconfigurable skin system.

DETAILED DESCRIPTION

Figure 1A:
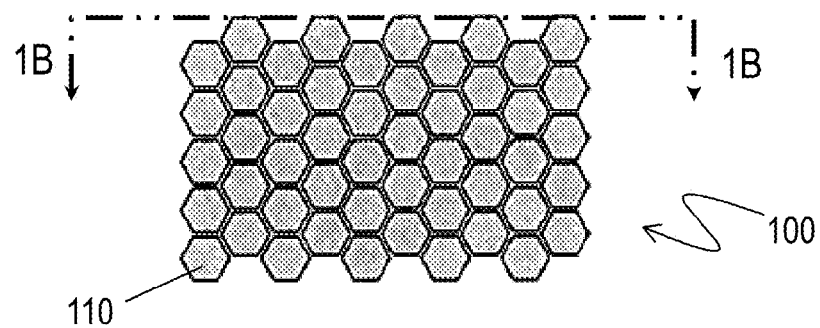
FIG. 1A is a top view of a reconfigurable skin system in a cold or inactive state, having a multi-cellular structure with infill material.
Figure 1B:
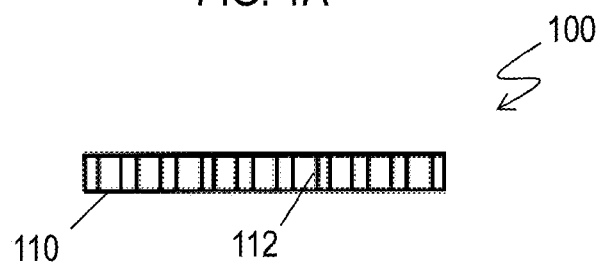
FIG. 1B is a cross-sectional view of the reconfigurable skin system of FIG. 1A in the cold or inactive state.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Referring to FIGS. 1A-6F, a reconfigurable skin system according to some embodiments may include a multi-cellular structure 100. The multi-cellular structure 100 may use intelligent spatially-targeted activation of a multi-phase infill material 200 deposited in each cellular unit 110 is disclosed. A stimulus or multiple stimuli may be applied (and/or removed) to individual cells 110 to selectively change the phase of the infill material 200 deposited in the selected cell 110, generating a tailored response of a desired bulk property morphology in response. When the stimulus is applied, individual cells 110 are converted to stimulated cells 111 having different topological structures. By exercising control over the application patter of the stimulus or multiple stimuli to the individual cells (FIGS. 6A-6F), a plurality of topologies may be generated to accommodate anticipated and/or unanticipated environmental and/or performance profile changes confronted during operation or use. By providing an infill material 200 that is responsive to application and removal of the stimulus or multiple stimuli, the phase or shape of the infill material 200 is reversible and provides improved flexibility to such changes.

A multi-cellular structure 100 may include a variety of configurations, including uniform and irregular cellular units, uniform and irregular geometrical arrangements and profiles, and/or planar and non-planar arrangements. As only one example of the possible configurations and arrangements, FIGS. 1A, 1B, 2A, 2B, 3A, 3B, and 6A-6F each depict various configurations of a multi-cellular 100 honeycomb pattern, having uniform cellular units formed in a regularly geometric pattern and predominantly planar arrangement. Accordingly, each cell is denoted by reference character 110, and includes walls or supports 112 comprising metal, carbon fiber reinforced polymer (CFRP), neat polymer, or other similarly suitable material. Each wall 112 is deflectable or deformable in multiple directions in response to forces exerted on each wall from one or more axes or directions. Generally, each wall 112 is susceptible to in-plane bending or buckling. The multiple cellular units, and the associated walls or supports 112 (and in this example, 112$a$-112$f$), form a matrix or network of structure that generally supports the composite skin but yields in response to a stimulus or multiple stimuli that are appropriately applied. Application of the stimulus to the individual cells 110 may cause the infill material 200 in the individual cells 110 to bulge outwardly from the wall 112 and change the topology of the reconfigurable skin system 100.

Each cell 110 may be filled with a multi-phase infill material 200 that is responsive to environmental and/or other external stimuli. As but one example, the infill material 200 may comprise an anisotropic material, which may comprise a variety of shape memory material, including shape memory polymer(s) (SMP). Shape memory material, including SMPs, may be multi-phase so that the material may be reversibly altered between low and high viscosity under stimulus and either provide support or permit buckling of the cellular walls 112a-f within which the material 200 is deposited. In this example, the reconfigurable skin comprises a two-phase SMP material, such as an epoxy SMP similar to that developed by General Motors, which comprises a rigid aromatic diepoxide, such as diglycidyl ether bisphenol A epoxy monomer (e.g., EPON826), and a flexible aromatic diepoxide, such as a poly(propylene glycol) bis(2-aminopropyl) ether (e.g., JeffamineD230). Either decylamin or neopentyl glycol diglycidyl ether (NGDE) may also be added if a lower glass transition temperature ($T_g$) is desired. This polymer has properties that are reversibly alterable for use in such applications. Accordingly, the SMP material is reversible between cold (stiff/rigid) and hot (flexible) phases. In the non-activated phase, the SMP material is cold, low viscosity, and expansive within the cellular unit space available so as to provide structural support to the walls of the cellular unit and resist or prevent temporary deformation. In the activated phase, the SMP material is warm to hot, yielding a higher viscosity, and becomes displaceable allowing deformity or morphing of the skin area controlled by the cellular unit.

Another example of infill material 200 includes materials having a high thermal expansion coefficient which can be utilized to create a rough surface for use as an active turbulator at a selective area. This will cause the laminar boundary layer to transition from laminar to turbulent and increase the attachment of material flow where it would otherwise normally separate.

Figure 5A:
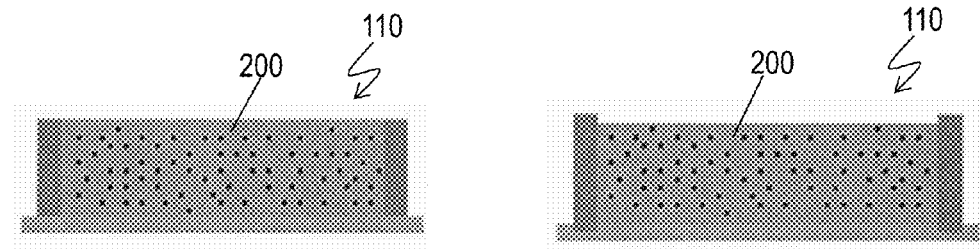
FIGS. 5A-5D schematically illustrate process stages for forming individual cells of reconfigurable skin systems with surface electrodes (left-hand side) or embedded electrodes (right-hand side)

Environmental and/or externally applied stimulus may be provided in one of several forms, including the application of thermal, electrical, magnetic, and/or illumination stimuli. As one example, and depicted in FIGS. 4A-4C and 5A-5D, each individual cellular unit 110 and associated infill material 200 may be equipped with a dedicated circuit for generating resistive heating sufficient to invoke a phase-change in the infill material 200. One example of such a dedicated circuit is depicted in FIGS. 4C and 5D. The infill material 200 may include top and bottom surfaces 210 and 220. A first electrically conductive layer 212 may be coextensive to the top surface 210 or embedded within the infill material 200 and adjacent to the top surface 210. Opposing (second and third) electrically conductive layers 222a and 222b may be coextensive to the bottom surface 220. The electrically conductive layers 222a and 222b are divided by an insulating barrier, channel, or gap 230 to form two portions 232 and 234. A positive lead wire 240 is coupled to one portion 232 or 234, and a negative lead wire 250 is coupled to the opposing or remaining portion 232 or 234. Additionally embedded within the infill material 200 are multiple resistive heating elements 260, with multiple resistive heating elements 260a and 260b associated with one of either the first portion 232 or the second portion 234 to effectuate the transmission of electricity through the cell 110. Upon application of an electrical source, the electricity flows through the positive lead wire 240 and portion 232 of the second electrically conductive layer 222a, through the multiple resistive heating elements 260a associated with portion 232, through the first electrically conductive layer 212 and into the multiple resistive heating elements 260b associated with portion 234, and out through the negative lead wire 250 and portion 234 of the third electrically conductive layer 222b.

Figure 2A:
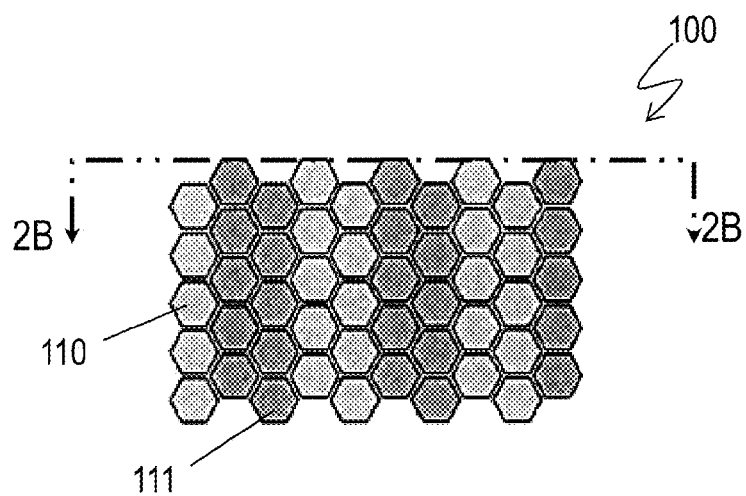
FIG. 2A is the top view of the reconfigurable skin system of FIG. 1A, in which the infill material is in a heated or activated state.
Figure 2B:
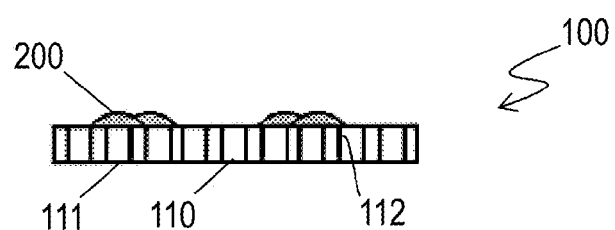
FIG. 2B is a cross-sectional view of the reconfigurable skin system of FIG. 1A in the heated or activated state.
Figure 3A:
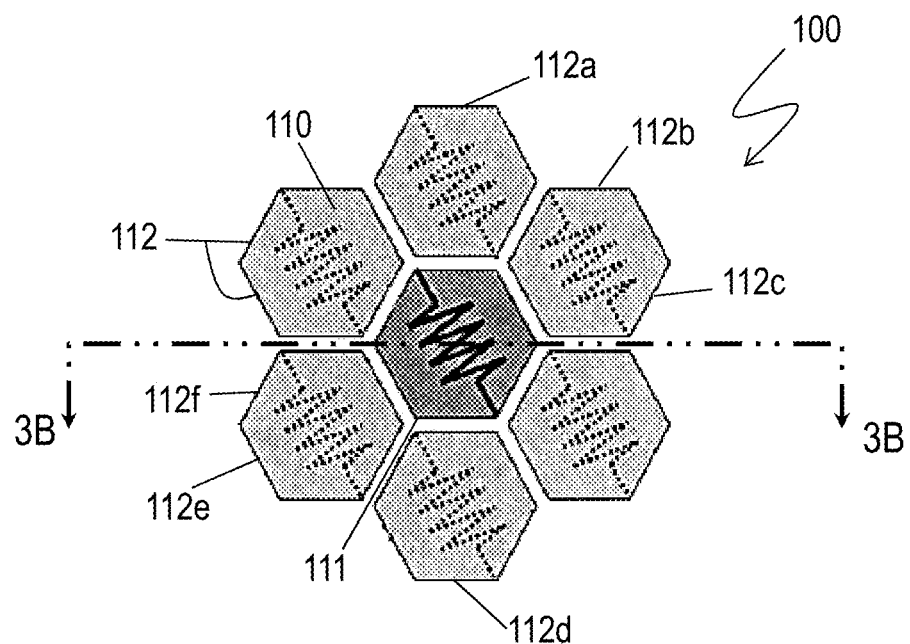
FIG. 3A is a top view of selected cells of the reconfigurable skin system of FIG. 1A, depicting deformation of an activated (e.g., heated) single cell among other inactivated cells.
Figure 3B:
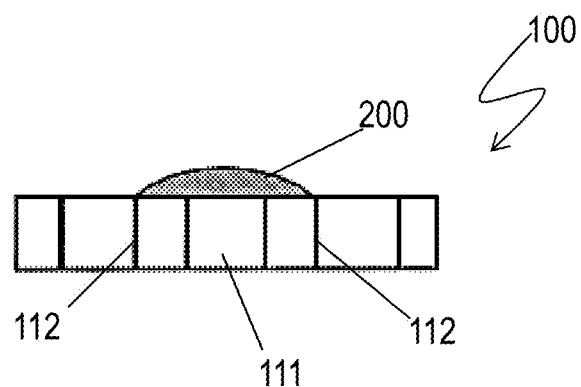
FIG. 3B is a cross-sectional view of the selected cells of FIG. 3A.

In this example, each cell that is heated (activated) is shaded in gray in the figures, such as in FIGS. 2A-2B, and 6B-6F). The cold (inactive) state is not shaded. FIGS. 2A and 3A both include an associated elevation view of the multi-cellular structure providing visual depiction of each active and inactive cell, such that an cell (shaded in gray) has a skin surface that is deformed, which is depicted as a bubble above the cellular unit. An inactive cell has a non-deformed skin surface. As depicted in FIGS. 6A-6F, there are multiple variations in selecting patterns for the configurable skin of the system described herein. Through the utilization and application of individual electrical circuits, each cellular unit may be targeted for activation or non-activation, providing variation in surface deformity as desired. Accordingly, the variations depicted in FIGS. 6A-6F are illustrations of but a few of the variations possible and envisioned for the reconfigurable skin system described herein.

One example of the resistive heating elements 260 utilized in the SMP material includes a nickel-molybdenum-iron (Ni—Mo—Fe) alloy, and may include such examples as Permalloy 80 (comprising by weight percentage 80% Ni, 2% Mo, and 18% Fe) or other available materials similarly composed. The Ni—Mo—Fe alloy material comprises spherical particles that are dispersed through the infill material 200. After curing of the multi-cell and infill material combination (explained in more detail below), the Ni—Mo—Fe particles are aligned to form multiple chains traversing the electrically conductive layers 212, 222 and the respective portions 232, 234 of the second and third electrically conductive layers 222a and 222b as described above. Upon application of an electrical source, the Ni—Mo—Fe particles conduct electricity and generate resistive heating along the particle arrays, heating one portion 232 of the cell 110 and quickly followed by heating of the opposing portion 234 so that the entire cell 110 is heated and the SMP material undertakes a phase-change for appropriately deforming under environmental conditions or parameters.

A composite skin for surface-morphing applications utilizes a two-step design process. First, bulk material properties are determined for the composite skin as well as the physical arrangement of the attachments used between the skin and the underlying multi-cellular substructure. In such an arrangement, the bulk material properties are distributed across the composite skin structure. Second, the bulk material property values are used as constraints to appropriately match the bulk material property values of multi-phase material(s) for determining the structural layout of individual cellular units utilizing microscopic multi-phase materials within each cellular unit.

The following example is offered by way of illustration, and one skilled in the art should recognize the example is not meant to be limiting.

Figure 8A:
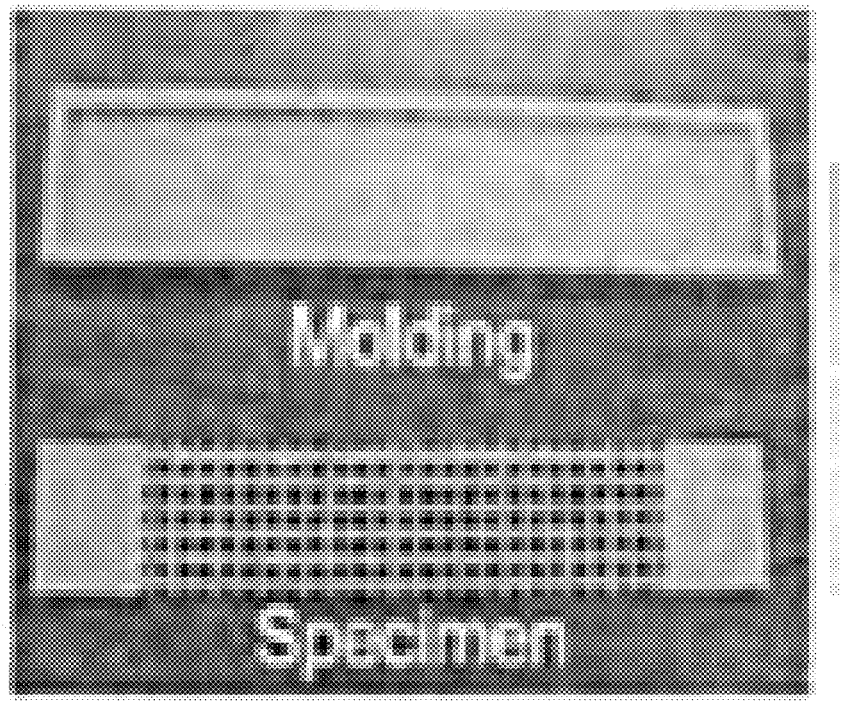
FIGS. 8A-8E are photographs of various molding steps used to fabricate the test specimen of FIG. 7C.
Figure 8B:
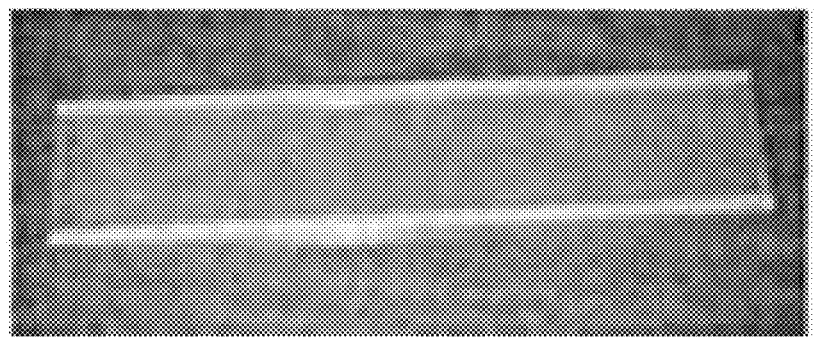
Figure 8C:
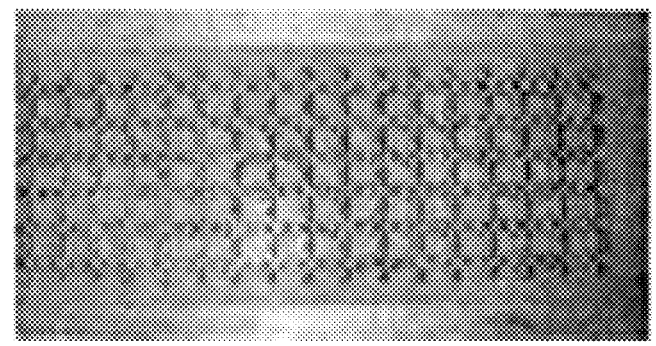
Figure 8D:
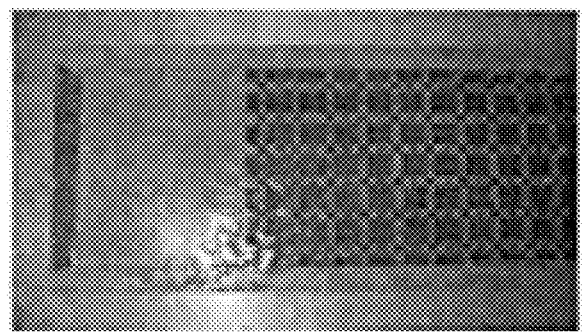
Figure 8E:
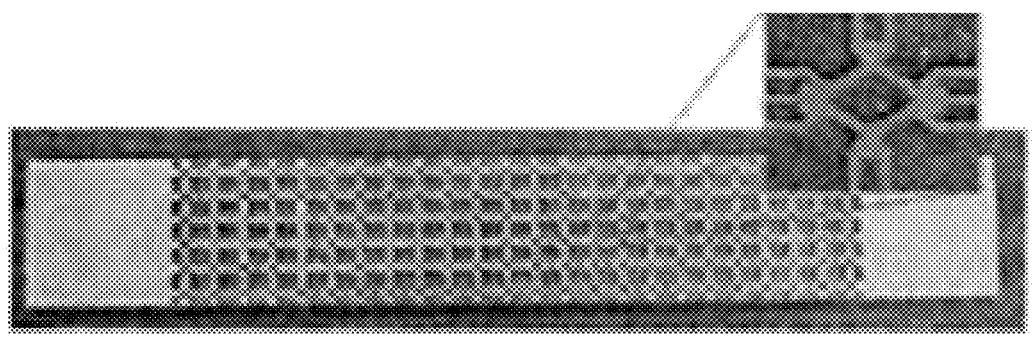

As depicted in FIGS. 7A-7C and 8A-8E, a dog-bone test specimen was constructed to estimate the material properties of the cellular wall or membrane. The test specimen was a matrix of 144 unit cells that was 6 cells wide by 24 cells long (FIG. 7C). The matrix was formed using the quality matrix shown in FIG. 7A, which produced the CAD depiction of an optimized structure shown in FIG. 7B. The fabrication process included: (i) fabricating the dog-bone specimen and molding using a rapid-prototype machine (FIG. 8A); (ii) spraying the mold with a silicon-based mold release and Kapton-film for easy removal post-molding (FIG. 8B); (iii) applying primer to the rapid-prototype machine plastic portion(s) (FIG. 8C); (iv) calculating the mold volume minus the rapid-prototype portion volume, and filling the mold with a corresponding volume of urethane with an additional 10% by volume; (v) placing the rapid-prototype machine portion into the mold and pressing the urethane (FIG. 8D); (vi) using a scraper to remove excess material from the top of the mold; and (vii) curing the molded material for 12 hours to 24 hours at 100° F. (FIG. 8E).

The material was mechanically tested using a 2.2 kip electro-mechanical test frame. Tension load in the x-direction was applied with a maximum applied load of 444.8 N at a rate of 1.27 mm/min. The stress-strain plot was drawn from both the MTS machine and a laser extensometer having a resolution of $1.016 \times 10^{-6}$ m. Strain-stress test data values along the X1 and X2 directions were measured by the MTS machine and the laser extensometer. The tests were performed under the same conditions as noted above, and the average values of five runs are shown in the plots. Trend lines were plottes for an estimation of the respective slope for each set of values. For $Q_{11}$, the slope of the averaged data points from the MTS machine was approximately $1.21 \times 10^8$ Pa, which is approximately 14% higher than the target value of $1.06 \times 10^8$ Pa. For $Q_{22}$, the slope of the averaged data points was approximately $1.66 \times 10^8$ Pa, which is approximately 13% lower than the target value $1.91 \times 10^8$ Pa. From the unit cell study, an increase in the number of unit cells demonstrated a 5% error for 36 (6×6) unit cells.

FIGS. 5A-5D depict the general steps in the manufacturing process, simplified to illustrate one cell 110 and infilling of multi-phase material 200 into the cell. On the left-hand side of FIGS. 5A-5D, the process steps are consistent with formation of surface electrodes. On the right-hand side of FIGS. 5A-5D, the process steps are consistent with formation of embedded electrodes. The step shown in FIG. 5A includes placing the honeycomb shell (formed by the process indicated above and illustrated by FIGS. 7A-7C and 8A-8E) on the appropriate substrate for application of the desired electrodes and infilling the honeycomb structure with the SMP resin/particle mixture. The step shown in FIG. 5B includes placing the mold in a magnetic field to align the particles into chains forming the resistive hearing element(s) 260 and placing it in a laboratory oven for curing. The mold is then removed from the oven at the completion of curing, and the honeycomb composite separated from the substrate, as depicted in the step shown in FIG. 5C includes. The final step, shown in FIG. 5D, includes constructing the electrodes and attaching lead wires to form the dedicated electrical circuit for each cell 110.

Depending upon the desired application of the individual cell(s), the infilling of each cell with multi-phase material 200 may be performed in multiple ways. If the conductive coating is applied to the surface of the skin, the honeycomb can be completely filled with multi-phase infill material 200. The honeycomb can simply be placed on a flat substrate and the resin infill composite poured into each cell 110 (as depicted in FIG. 5A). If the conductive coating is embedded within the cell structure, a negative mold of the honeycomb cells must be made to reserve space at the bottom of each cell during infilling thereafter. When the mold is removed, this space can be used for the electrodes, resulting in a uniformly flat top surface as well as a more structurally sound composite, since the honeycomb cellular support shell or structure extends the entire thickness of the skin (as depicted in FIG. 5A).

Figure 5B:
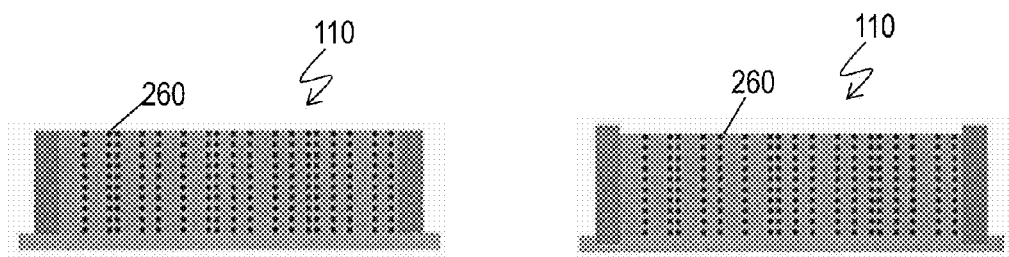
Figure 5C:
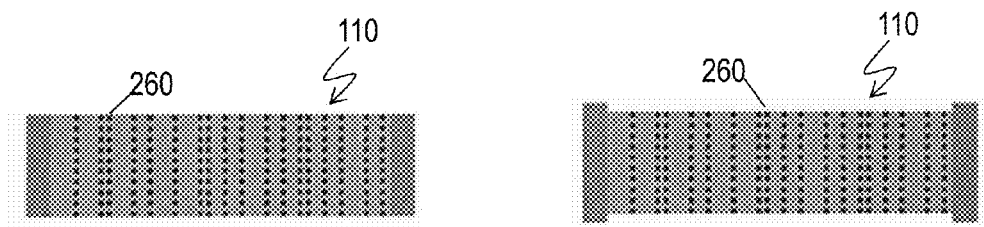
Figure 5D:
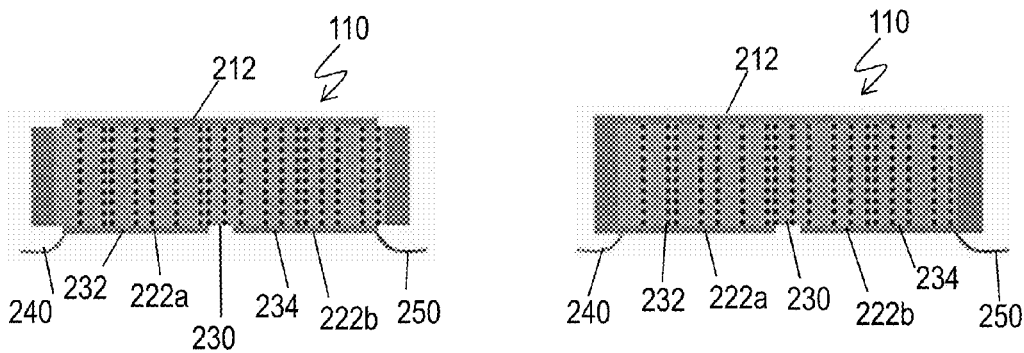
Figure 6A:
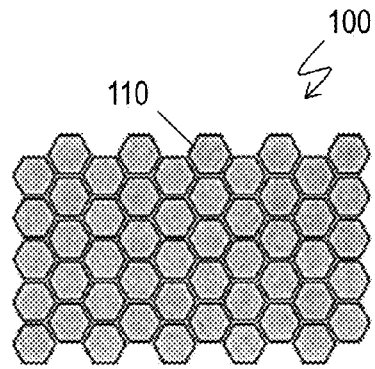
FIG. 6A-6F illustrate exemplary patterns for active and inactive cells of a reconfigurable skin system.
Figure 6B:
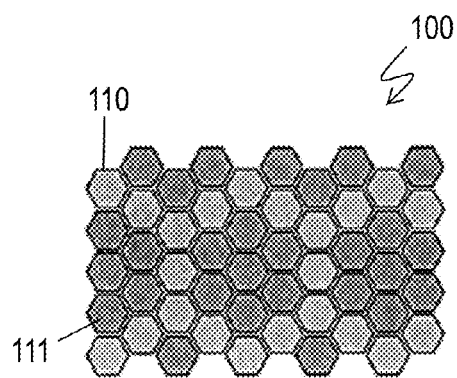
Figure 6C:
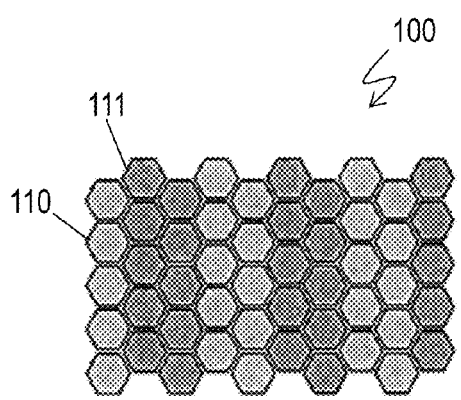
Figure 6D:
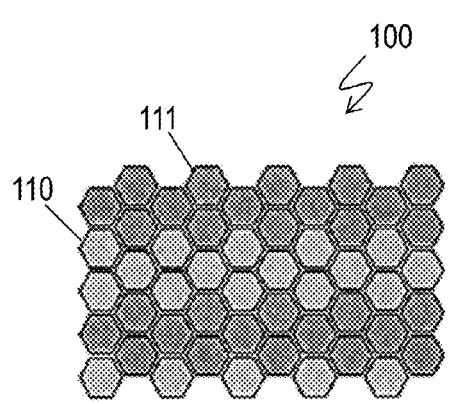
Figure 6E:
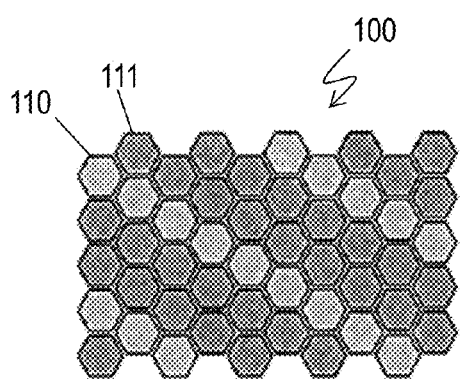
Figure 6F:
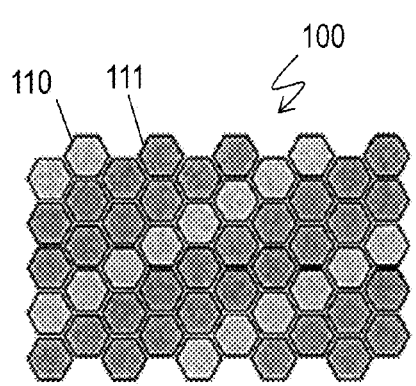

During the curing process illustrated in FIG. 5B, the Ni—Mo—Fe particles are aligned into chains along the applied magnetic field lines. Neodymium (e.g., N42SH) magnets, serviceable up to 150° C., are suspended above and below the sample. The magnets are 60 mm apart with the sample placed in the center. Each magnet is 101.6 mm long and 3.175 mm thick. The sample shown is 50 mm long and 5 mm thick. The magnetic field within the sample has an average strength of 0.037 T, excluding the concentration points at the ends of the sample, with a standard deviation of 0.0005 T. Maximum and minimum values are 0.039 T and 0.036 T respectively.

The residual field created in the particles by the magnets causes the particles to be attracted to one another, forming chains along the magnetic field lines between the two magnets. The entire assembly is placed in an oven for curing (FIG. 5C), ensuring good particle alignment during the expansion and shrinking that occurs during curing. With the magnets in place, the entire ensemble is placed in a laboratory oven and the composite cured via a traditional epoxy cure temperature cycle. Upon cure completion, the sample is removed from the mold and prepared for application of electrodes (FIG. 5D).

Several viable options are available for applying electrodes to the individual cells. For example, conductive silicone (such as materials available from Dow Corning and Silicone Solutions (SS26S) are very flexible. Silicone and silver based composites (like SS26S) are easily applied and have electrical volume resistivity of $5 \times 10^{-5}$ Ωm. By comparison, nickel-chrome based composites (such as Nichrome) possess a resistivity of $1.1 \times 10^{-6}$ Ωm, amorphous carbon composites possess a resistivity of $5 \times 10^{-4}$ Ωm to $8 \times 10^{-4}$ Ωm, and pure silicone possesses a resistivity of $6.4 \times 10^{-2}$ Ωm. Copper, which is typically used in electrical circuits, has a much lower resistivity of $1.68 \times 10^{-8}$ Ωm. Other examples of viable electrode application include flexible electronics, such as metallic meshes. Such meshes are capable of sufficient strains as to be applicable in the described reconfigurable skin system. Alternatively, the SMP material may be doped to a defined depth with sufficient amounts of carbon black, carbon fiber, nickel, or other suitably conductive particles so as to provide an embedded electrode and create an electrically conductive SMP material. Such an electrode would mirror the stiffness state of the infill material 200 and assist in the structural rigidity of the skin.

Preliminary studies and modeling of the reconfigurable skin system described herein indicate that out-of-plane deflection of less than 0.1 is attainable with the given load and size and weight restrictions. The studies and modeling also indicate that activation times of less than 5 seconds are attainable. The reconfigurable skin system is expected to be able to support in-plane strain greater than 15%.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

Though the specific embodiments have been described, it should be apparent that modifications and variations are possible. More specifically, although some aspects are identified herein as preferred or particularly advantageous, it is contemplated that the embodiments described herein are not necessarily limited to these preferred aspects.

What is claimed is:

1. A reconfigurable skin system comprising:
a support structure of deflectable supports defining a plurality of cells through the support structure from a first side of the support structure to a second side of the support structure opposite the first side, each individual cell of the plurality of cells comprising:
a composite infill at least partially filling the individual cell, the composite infill comprising a shape memory polymer and a plurality of conductive particles dispersed through the shape memory polymer and configured as conductive chains from a first end of the individual cell nearest the first side of the support structure to a second end of the individual nearest the second side of the support structure;
a first conductive layer at the first end of the individual cell and in electrical communication with the conductive chains;
a second conductive layer at the second end and in electrical communication with the conductive chains;
a third conductive layer at the second end and in electrical communication with the first conductive and the second conductive layer through only the conductive chains;
a first electrode connected to the second conductive layer; and
a second electrode connected to the third conductive layer, wherein when electricity flows from the first electrode to the second electrode through each individual cell, the conductive chains resistively heat the shape memory polymer to induce a shape change in the shape memory polymer.

2. The reconfigurable skin system of claim 1, wherein the shape memory polymer comprises a diglycidyl ether bisphenol A epoxy monomer and a poly(propylene glycol) bis(2-aminopropyl) ether.

3. The reconfigurable skin system of claim 2, wherein the composite infill further comprises an additive that lowers the glass transition temperature of the shape memory polymer.

4. The reconfigurable skin system of claim 3, wherein the additive comprises decylamine or neopentyl glycol diglycidyl ether.

5. The reconfigurable skin system of claim 1, wherein the conductive particles comprise a conductor chosen from carbon black, carbon fiber, nickel, nickel alloys, and combinations thereof.

6. The reconfigurable skin system of claim 1, wherein the deflectable supports comprise a metal, a carbon-fiber reinforced polymer, or a neat polymer.

7. The reconfigurable skin system of claim 1, wherein the electrodes comprise a conductive material having an electrical volume resistivity greater than $1.1 \times 10^{-6}$ Ωm, the conductive material chosen from metallic mesh or a conductive composite of silicone and silver.

8. The reconfigurable skin system of claim 1, wherein:
the shape-memory polymer comprises a diglycidyl ether bisphenol A epoxy monomer and a poly(propylene glycol) bis(2-aminopropyl) ether; and
the conductive particles comprise a nickel alloy.

9. The reconfigurable skin system of claim 8, wherein the nickel alloy is a Ni—Mo—Fe alloy.

10. The reconfigurable skin system of claim 9, wherein the Ni—Mo—Fe alloy comprises at least 80 wt. % nickel, based on the total weight of the Ni—Mo—Fe alloy.

11. The reconfigurable skin system of claim 9, wherein the Ni—Mo—Fe alloy comprises about 80 wt. % nickel, about 18 wt. % iron, and about 2 wt. % molybdenum, based on the total weight of the Ni—Mo—Fe alloy.

12. A reconfigurable skin apparatus comprising:
a support structure of deflectable supports defining a plurality of cells through the support structure from a first side of the support structure to a second side of the support structure opposite the first side, each individual cell of the plurality of cells comprising:
a composite infill at least partially filling the individual cell, the composite infill comprising a shape memory polymer and a plurality of conductive particles dispersed through the shape memory polymer and configured as conductive chains from a first end of the individual cell nearest the first side of the support structure to a second end of the individual nearest the second side of the support structure;
a first conductive layer at the first end of the individual cell and in electrical communication with the conductive chains;
a second conductive layer at the second end and in electrical communication with the conductive chains;
a third conductive layer at the second end and in electrical communication with the first conductive and the second conductive layer through only the conductive chains;
a first electrode connected to the second conductive layer; and
a second electrode connected to the third conductive layer, wherein when electricity flows from the first electrode to the second electrode through each individual cell, the conductive chains resistively heat the shape memory polymer to induce a shape change in the shape memory polymer;
a stimulus source in communication with the first electrodes and the second electrodes of the individual cells; and
a control apparatus that sends a stimulus from the stimulus source to selected individual cells to form a reconfigured surface having bumps formed from the first ends of the selected individual cells.

13. The reconfigurable skin apparatus of claim 12, wherein the shape memory polymer comprises diglycidyl ether bisphenol A epoxy monomer and poly(propylene glycol) bis(2-aminopropyl) ether.

14. The reconfigurable skin apparatus of claim 13, wherein the conductive particles are nickel or a nickel alloy.

15. The reconfigurable skin apparatus of claim 12, wherein the stimulus is electricity, a magnetic field, or an illumination with electromagnetic radiation.

16. A method of reconfiguring a surface defined by a reconfigurable skin apparatus, wherein the reconfigurable skin apparatus comprises:
a support structure of deflectable supports defining a plurality of cells through the support structure from a first side of the support structure to a second side of the support structure opposite the first side, each individual cell of the plurality of cells comprising:
a composite infill at least partially filling the individual cell, the composite infill comprising a shape memory polymer and a plurality of conductive particles dispersed through the shape memory polymer and configured as conductive chains from a first end of the individual cell nearest the first side of the support structure to a second end of the individual nearest the second side of the support structure;
a first conductive layer at the first end of the individual cell and in electrical communication with the conductive chains;
a second conductive layer at the second end and in electrical communication with the conductive chains;
a third conductive layer at the second end and in electrical communication with the first conductive and the second conductive layer through only the conductive chains;
a first electrode connected to the second conductive layer; and
a second electrode connected to the third conductive layer, wherein when electricity flows from the first electrode to the second electrode through each individual cell, the conductive chains resistively heat the shape memory polymer to induce a shape change in the shape memory polymer;
a stimulus source in communication with the first electrodes and the second electrodes of the individual cells; and
a control apparatus that sends a stimulus from the stimulus source to selected individual cells to form a reconfigured surface having bumps formed from the first ends of the selected individual cells, the method comprising:
selecting at least one morphing cell from the plurality of individual cells; and
applying a stimulus to the at least one morphing cell to cause the shape memory polymer in the at least one morphing cell to undergo a shape-change transformation.

17. The method of claim 16, wherein the shape memory polymer comprises diglycidyl ether bisphenol A epoxy monomer and poly(propylene glycol) bis(2-aminopropyl) ether.

18. The method of claim 16, wherein the conductive particles are nickel or a nickel alloy.

19. The method of claim 16, wherein:
the shape memory polymer comprises diglycidyl ether bisphenol A epoxy monomer and poly(propylene glycol) bis(2-aminopropyl) ether; and
the conductive particles are nickel or a nickel alloy.

20. The method of claim 16, wherein the applying the stimulus comprises a heating or cooling the at least one morphing cell, sending electricity through the at least one morphing cell, exposing the at least one morphing cell to a magnetic field, or illuminating the at least one morphing cell with electromagnetic radiation.

* * * * *